United States Patent [19]

Lasoen

[11] Patent Number: 4,499,775
[45] Date of Patent: Feb. 19, 1985

[54] TRACTOR DRAFT SENSING APPARATUS WITH SENSING UNIT POSITIONED OUTBOARD OF EACH LINK

[75] Inventor: Jean J. Lasoen, Ville Preux, France

[73] Assignee: Massey-Ferguson Services N.V., Curacao, Netherlands Antilles

[21] Appl. No.: 440,210

[22] PCT Filed: Feb. 5, 1982

[86] PCT No.: PCT/EP82/00020
§ 371 Date: Oct. 4, 1982
§ 102(e) Date: Oct. 4, 1982

[87] PCT Pub. No.: WO82/02815
PCT Pub. Date: Sep. 2, 1982

[30] Foreign Application Priority Data

Feb. 23, 1981 [GB] United Kingdom ............... 8105861

[51] Int. Cl.³ .................................. A01B 63/112
[52] U.S. Cl. .................... 73/862.57; 172/7; 172/430
[58] Field of Search .............. 172/2, 7, 9, 10, 430; 73/862.57

[56] References Cited
U.S. PATENT DOCUMENTS 3,342,274 9/1967 Wridt, Jr. ........................... 172/7
3,888,315 6/1975 Elfes et al. ......................... 172/7
4,173,259 11/1979 Heckenkamp ................... 172/7 X
4,271,910 6/1981 Schafer ........................ 172/430 X Primary Examiner—Richard T. Stouffer
Attorney, Agent, or Firm—John C. Thompson

[57] ABSTRACT

A tractor draft sensing apparatus in which a shaft (14) is supported at laterally spaced locations (15) on a tractor and carries at locations (22) outboard of the shaft supports a pair of lower draft links (10) so that the imposition of a draft link (10) to monitor the deflection of the shaft (14) (or an extension (28) thereof) to provide a signal indicative of the draft force being imposed on each draft link. In a form of the sensing system for use on a tractor in which the draft links are raised by external piston and cylinder assemblies whose lower ends are secured to the tractor at locations outboard of the draft links and in alignment with the longitudinal axis of the shaft, the lower ends (36) of the cylinders (32) are connected with the tractor by hollow pins (33) through which the shaft (14) (or an extension (28) thereof) extends. Each sensing unit (42) is located outboard of the associated hollow pin (33) and the clearance between the hollow pin (33) and the shaft (14) (or its extension (28)) allows the shaft (or its extension) unrestricted freedom to deflect in response to draft forces within the designed operating range of the tractor.

8 Claims, 6 Drawing Figures

TRACTOR DRAFT SENSING APPARATUS WITH SENSING UNIT POSITIONED OUTBOARD OF EACH LINK

TECHNICAL FIELD

This invention relates to a tractor draft sensing apparatus which forms part of a tractor draft control system.

It is known to provide a tractor draft control system which includes electrical circuitary which receives a signal from a draft force sensing unit indicative of the draft force being applied to the draft links of the tractor, compares this signal with a signal set by the operator and indicative of the required draft setting, and produces an output signal from this comparison which is used to regulate the height of the draft links so that the tractor works with the implement operating as near as possible to the required draft set by the operator.

DISCLOSURE OF THE INVENTION

It is an object of the present invention to provide an improved form of tractor draft sensing apparatus which enables the draft forces experienced by the draft links to be accurately relayed to the electrical circuitary of the draft control system.

According to the present invention there is provided a tractor draft sensing apparatus comprising a shaft supported at laterally spaced locations on a tractor and carrying at locations outboard of the shaft supports a pair of lower draft links so that the imposition of a draft force on the links bends the shaft, the system being characterised by the provision of a sensing unit positioned outboard of each draft link to monitor the deflection of either a portion of the shaft located outboard of the link or an axial extension of the shaft located outboard of the link to provide signals indicative of the draft force being imposed on each draft link.

As will be appreciated, the facility to separately measure the draft force of each link enables more accurate control of implements in certain conditions when the draft force imposed on the links is not equal. Also by positioning the sensing units outboard of the draft links a tractor originally designed for the use of a mechanical draft control system can be easily adapted for the use of electrical sensing units. In a tractor in which the draft links are raised by external piston and cylinder assemblies whose lower ends are secured to the tractor at locations outboard of the draft links and in alignment with the longitudinal axis of the shaft, the present invention can be realised by connecting the lower ends of the cylinders with the tractor by hollow pins through which the shaft (or an extension thereof) extends, each sensing unit being located outboard of the associated hollow pin and the clearance between the hollow pin and the shaft (or its extension) allowing the shaft (or its extension) unrestricted freedom to deflect in response to draft forces within the designed operating range of the tractor.

In such an arrangement each sensing unit can be adustably mounted on a support member carried by one end of the associated hollow cylinder mounting pin. The support member also preferably carries a protective cover which protects the sensing unit from blows and contamination by foreign matter.

Preferably the sensing units monitor the deflection of shaft extensions which are of tapering form, the cross-sectional area of the extensions reducing with increasing distance from the draft links.

Preferably the sensing units are of the electrical variable inductance type.

Preferably the or each sensing unit is adjustably mounted on the tractor for easy adjustment towards and away from the centre line of the shaft (or its extension) during the zeroing or setting up of the system.

DESCRIPTION OF THE DRAWINGS

One embodiment of the present invention will now be described, by way of example only, with reference to the accompanying drawings in which.

BEST MODE OF CARRYING OUT INVENTION

Figure 1:
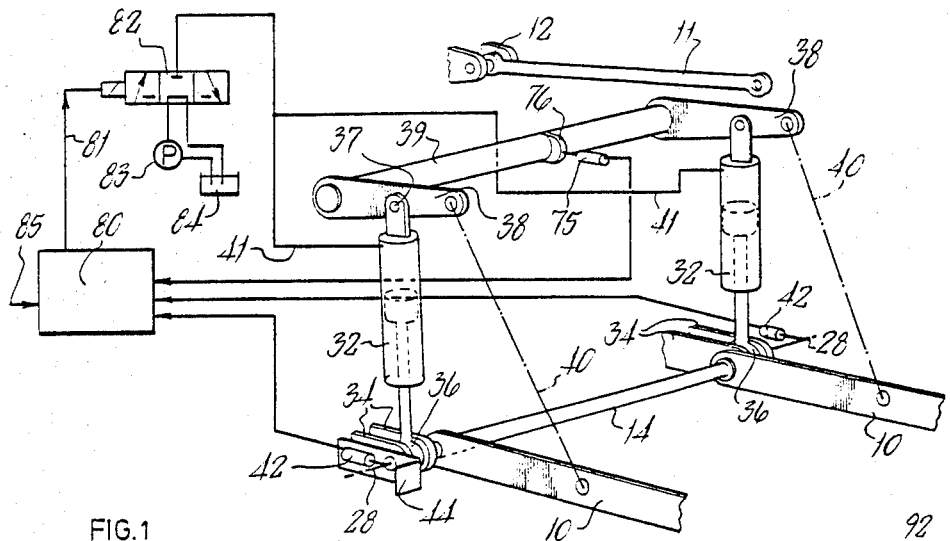
FIG. 1 is a diagramatic perspective view of the rear implement hitch of a tractor embodying the present invention.
Figure 2:
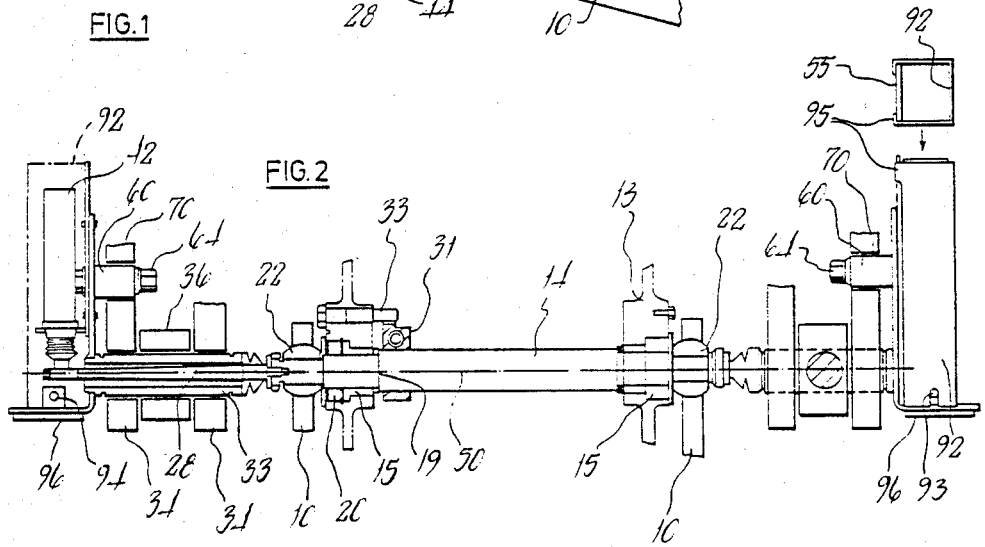
FIG. 2 is a plan view, partly in section, of part of the hitch of FIG. 1.
Figure 4:
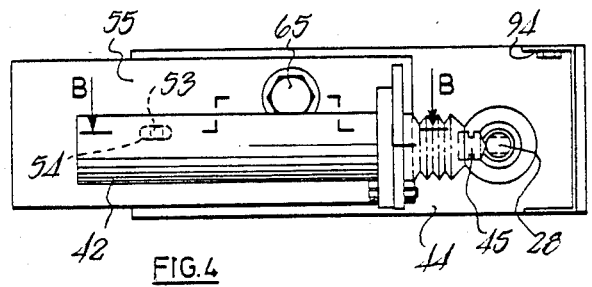
FIG. 4 is an end view in the direction of Arrow A of FIG. 3.
Figure 3:
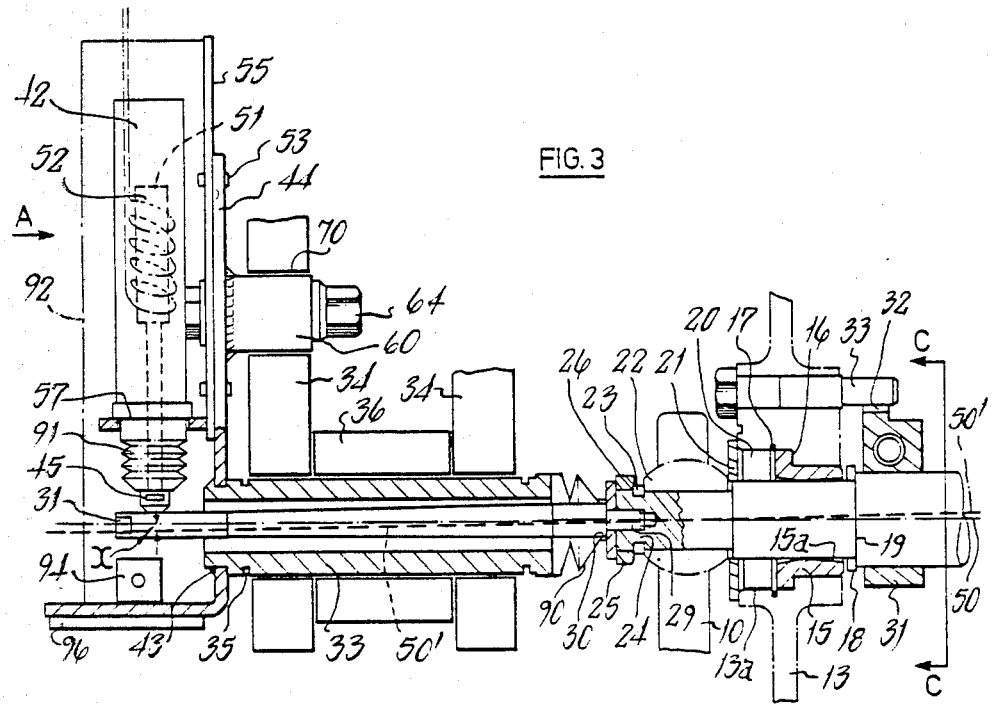
FIG. 3 shows the left-hand part of FIG. 2 on a larger scale.

Referring to FIGS. 1 and 2 these show a tractor rear implement hitch comprising a pair of lower draft links 10 supported from a tractor rear housing 13 via a shaft 14, and a top link 11 which is pivotally supported at 12 from housing 13. FIG. 3 shows in greater detail the mounting of the shaft 14 and one associated draft links 10. As can be seen the shaft 14 is supported by two spaced fulcrum bearings 15 whose inner surface 15a which contacts the shaft 14 is defined by two intersecting cones which are shown in exaggerated detail in FIG. 3 for clarify. Each fulcrum bearing 15 is held against a shoulder 16 on the housing 13 by a circlip 17, a washer 18 being trapped between the other end of the fulcrum bearing and a shoulder 19 formed on the shaft. Outboard of the circlip 17 a seal 20 is provided, and a large washer 21 closes off the bearing support aperture 13a in the housing. The washer 21 is held in place by a ball mounting 22 which mounts the associated draft link 10 on the shaft 14. Each ball 22 is held against the associated washer 21 by a two piece ring 23 which is split about a diameter and located in an annular groove 24 cut in the end portion of the shaft. The two piece ring 23 is held in position by a single piece ring 25 which is provided with a tapered surface 26 which overhangs part of the ring 23. Ring 25 is retained in position by a washer 27 which is in turn held in place by a shoulder 30 on an end portion of shaft 14 provided in the form of a sensing probe 28 which is screwed into the remainder of the shaft at 29. Flats 31 are provided on the outer end of the sensing probe 28 to facilitate screwing into position.

Figure 5:
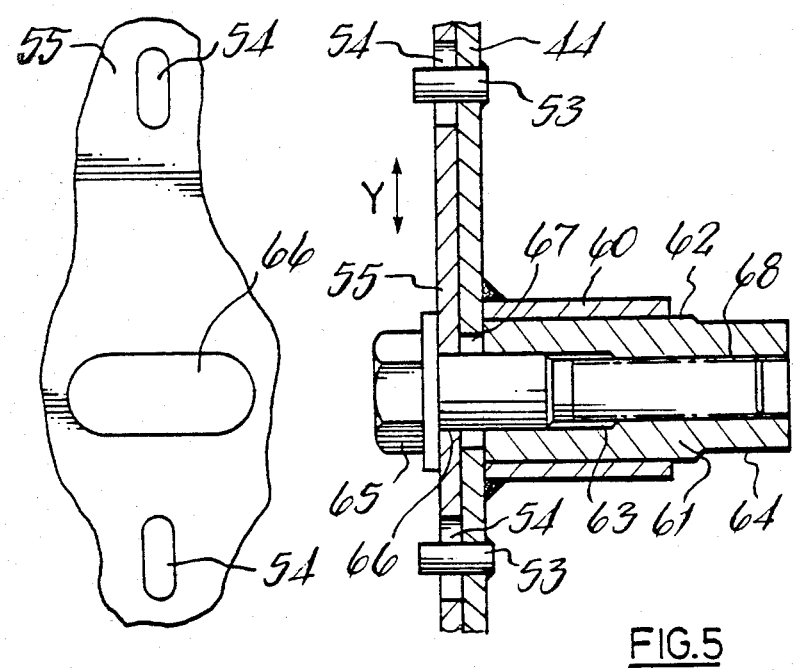
FIG. 5 is a section of the line B—B of FIG. 4.
Figure 6:
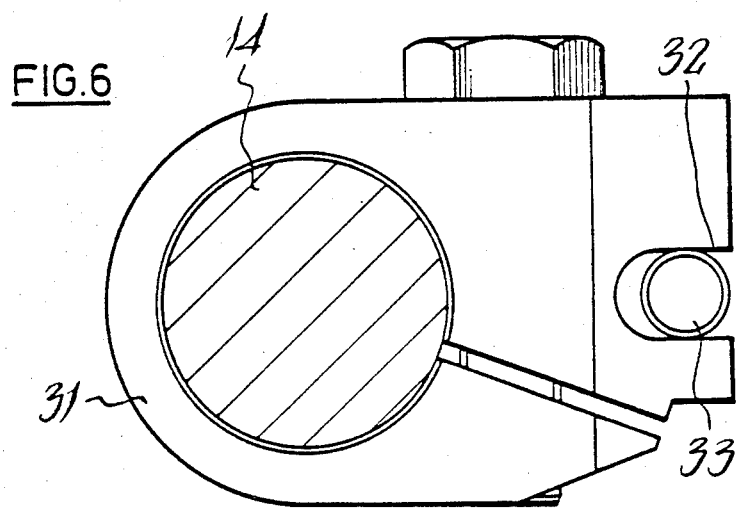
FIG. 6 is a section on the line C—C of FIG. 3.

Rotation of the shaft 14 is prevented by a clamp 31, shown in greater detail in FIG. 5, which is provided with a slot 32 which engages a peg 33 which projects from the housing 13. The use of clamp 31 to prevent rotation of the shaft 14 ensures greater draft signal accuracy.

The draft links 10 are arranged to be raised by a pair of external piston and cylinder assemblies 32 whose lower ends 36 are mounted on the tractor housing 13 by hollow pins 33 which extend through mounting lugs 34. The pins 33 are retained in the lugs 34 by circlips positioned in grooves 35 in pins 33. As will be described in further detail below, the end portions of shaft 14 provided by sensing probe 28 extend through the hollow cylinder mounting pins 33.

The upper ends of the piston and cylinder assemblies 32 are connected at 37 with lift arms 38 carried on the ends of a cross shaft 39 which is rotatably supported from the tractor housing 13. In conventional manner the lift arms 38 are connected with the links 10 via drop arms 40. As will be understood the height of the draft links is controlled by admitting or exhausting hydraulic fluid from the upper ends of the piston and cylinders asemblies 32 via lines 41.

The draft forces imposed on the two draft links are measured by sensing units 42 which are supported from L-shaped plates 44 which are welded at 43 to the outer ends of hollow pins 33. Each sensing unit has a sensing element 45 which is arranged to bear against the outer end portion of the associated sensing probe 28. Thus as the draft links are subjected to a draft force and the shaft 14 bends (as indicated by the dotted line position 50' of the longitudinal axis 50 of the bar 14) the sensing elements follow the deflection x of the outer ends of the sensing probes 28 and this mechanical movement x is used to produce an electrical output proportional to the draft force being applied to the draft links.

Conveniently the sensing units may be of the electrical variable inductance type in which a metal pole piece 51 is connected with the sensing elements of the sensing unit and moved relative to a coil 52 to produce a variation in the electrical inductance of the sensing unit which is proportional to the draft force being applied to the draft links.

The sensing units 42 are adjustably mounted on the L-shaped plates 44 by pins 53 on the plates 44 which engage slots 54 in a support member 55 to which each sensor unit is secured by a nut and bolt assembly 56. This pin and slot arrangement allows the sensing unit 42 to be moved towards and away from the centre line 50 of the associated sensing probe 28 in a plane passing through the centre line so that the distance Z between the outer ends of the sensing element of the unit and a datum shoulder 57 on the unit is adjusted in accordance with the manufacturers recommendations when the system is being set-up or zeroed during assembly at the tractor manufacturing plant. The movement of the supports 55 relative to the associated plates 44 is achieved by an eccentric arrangement shown in greater detail in FIG. 5. A sleeve 60 is welded on the inside of each plates 44 and an adjustment member 61 with a cylindrical external surface 62 is mounted within the sleeve. Adjustment member 61 has an internal bore 63 which is positioned eccentrically relative to the longitudinal axis of the adjustment member. The end portion 64 of adjustment member 61 is provided with a number of flats in order to enable it to be rotated with the sleeve 60. A clamping bolt 65 extends through a slot 66 in the support 55 which is elongated in a direction perpendicular to the direction of elongation of the slots 54. Clamping bolt 65 also extends through a circular hole 67 in plate 64 and engages a screw threaded portion 68 of the internal bore 63.

Thus with the clamping bolt 65 loose, rotation of the adjustment member 61 using the flats 64 causes the bolt 65 and hence the support member 55 to be displaced in the direction Y of FIG. 5 under the guidance of pins 53 thus enabling the distance Z to be adjusted in accordance with the manufacturers recommendations. When the correct adjustment of distance Z is obtained the nut 65 is simply tightened to maintain this adjustment.

Sleeves 60 also fulfill an additional function by extending into bores 70 in the outer of each pair of mounting lugs 34. This prevents rotation of the plates 44 about the sensing probes 28 and ensures that the line of action of movement of the sensing elements is maintained substantially horizontal thus ensuring that the sensing elements accurately record deflections of the shaft 14 due to draft loads, it being understood that these loads act in a generally horizontal direction.

As can be seen from FIGS. 2 and 3 sensing probes 28 are of tapering form being thickest and thus stiffest at their inner ends. This tapering form helps to reduce vibration of the sensing probes thus giving a more accurate draft force indication and also allows a larger deflection of the outer end portions of the sensing probes without contacting the insides of pins 33.

Flexible polymeric covers 90 and 91 are provided to prevent the ingress of dirt and other contaminants between the probes 78 and pins 33 and also into the sensing units 42. Sheet metal protective covers 92 of channel section are supported from plates 44 and supports 55 by screws or bolts 93 which engage ears 94 on plates 44 and by lugs 95 which clip behind supports 55. Reflectors 96 are also carried by plates 44.

In addition to sensing the draft forces applied to the links a further electrical sensor 7 is provided which contacts a cam 76 mounted on the cross shaft 39. Thus as the cross shaft 39 rotates with the rise and fall of the draft links 10 the sensing unit 75 provides a varying electrical signal indicative of the position of the draft links so that the implement hitch can be operated in the so called "position control" mode.

The outputs from sensing units 42 and from sensing unit 75 are fed into an electrical circuit diagrammatically illustrated by box 80. This circuit can be set to control the implement hitch solely in response to signals received from the shaft force sensing units 42, in which case the hitch is operating in the "draft control" mode. Alternatively the circuit 80 can control the implement hitch solely in response to the signals received from sensing unit 75, in which case the hitch is controlled in the so called "position control" mode. It is also possible to arrange the circuit 80 to control the hitch in response to a mix of the signals received from sensing units 42 and 75. This is the so called "intermix" mode of operation.

The input signals received by circuit 80 from sensing units 42 and/or 75 (which are indicative of the actual draft and/or position readings of the hitch) are compared with a nominal value input signal 85 (which is set by the operator and is indicative of, for example, the required draft or position setting of the hitch) to produce an error or output signal 81. This output signal 81 is used to control the operation of a three position solenoid operated hydraulic valve 82 which either supplies pressurised fluid to lines 41 from a pump 83 to raise the draft links, connects lines 41 to a sump 84 lower the draft links, or cuts-off lines 41 from pump 83 and sump 84 to hold the draft links in a given position. Thus the actual hitch operating condition is maintained substantially as set by the nominal input signal 85.

I claim:

1. A draft sensing apparatus for use on a tractor comprising:
    an elongate sensing shaft having end portions whose deflection by draft forces is to be monitored;

a pair of fulcrum supports for the shaft, the supports being arranged to support the shaft at laterally spaced locations on a tractor;

a pair of lower draft links carried on the shaft at locations outboard of the fulcrum supports and inboard of the end portions so that the imposition of a draft force on the links bends the shaft and deflects the end portions, and a sensing unit positioned outboard of each draft link to monitor the deflection of the associated end portion of the shaft to provide separate signals indicative of the draft force imposed on each draft link.

2. A sensing apparatus according to claim 1 in which the portions of the shaft outboard of the draft links whose deflection is monitored by the sensing units are of tapering form, the cross-sectional area of said tapering shaft portions reducing with increasing distance from the draft links.

3. A sensing apparatus according to claim 1 in which the sensing units are of the electrical variable inductance type.

4. A sensing apparatus according to claim 1 in which adjustable mounting means are provided for adjustably mounting each sensing unit on the tractor, said adjustrable mounting means allowing easy adjustment towards and away from the center line of the shaft during the zeroing or setting up of the apparatus.

5. A sensing apparatus according to claim 4 in which the adjustable mounting means of each sensing unit comprises a pin and slot arrangement which limits movement of the sensing unit to a single plane passing through the center line of the shaft and the unit is moved in this plane by an eccentric cam arrangement, a clamping bolt being provided to hold the sensing unit in a fixed position relative to the tractor once correctly adjusted.

6. A draft sensing apparatus for use on a tractor comprising:

an elongate sensing shaft having end portions whose deflection by draft forces is to be monitored;

a pair of fulcrum supports for the shaft, the supports being arranged to support the shaft at laterally spaced locations on a tractor;

a pair of lower draft links carried on the shaft at locations outboard of the fulcrum supports and inboard of the end portions so that the imposition of a draft force on the links bends the shaft and deflects the end portions;

a pair of hollow pins for mounting a pair of external draft-link-raising piston and cylinder assemblies on the tractor at locations outboard of the draft links and in alignment with the longitudinal axis of the shaft, each end portion of the shaft extending through a respective one of said hollow pins with sufficient clearance to allow the end portion unrestricted freedom to deflect in response to draft forces within the designed operating range of the apparatus, and a sensing unit positioned outboard of each hollow pin to monitor the deflection of the associated end portion of the shaft to provide separate signals indicative of the draft force imposed on each draft link.

7. A sensing apparatus according to claim 6 in which each sensing unit is mounted on a support member carried by one end of the associated hollow cylinder mounting pin.

8. A sensing apparatus according to claim 7 in which each support member carries a protective cover which protects the sensing unit from blows and contamination by foreign matter.

* * * * *